US008853289B2

(12) United States Patent
Smith et al.

(10) Patent No.: US 8,853,289 B2
(45) Date of Patent: Oct. 7, 2014

(54) FOAM COMPOSITIONS FOR SELECTIVE RECOVERY OF OIL SPILLS AND OTHER APPLICATIONS

(75) Inventors: Scott C. Smith, Osterville, MA (US); Robert F. Hurley, Centerville, MA (US); Kevin M. Hoffman, St. Johnsville, NY (US)

(73) Assignees: Scott C. Smith, Osterville, MA (US); Opflex Technologies, LLC, Indianapolis, IN (US)

( * ) Notice: Subject to any disclaimer, the term of this patent is extended or adjusted under 35 U.S.C. 154(b) by 304 days.

(21) Appl. No.: 12/886,195

(22) Filed: Sep. 20, 2010

(65) Prior Publication Data
US 2011/0287929 A1    Nov. 24, 2011

Related U.S. Application Data

(60) Provisional application No. 61/346,022, filed on May 18, 2010.

(51) Int. Cl.
*C08J 9/00* (2006.01)
*C08J 9/06* (2006.01)
*C08J 9/10* (2006.01)

(52) U.S. Cl.
CPC .... *C08J 9/00* (2013.01); *C08J 9/06* (2013.01); *C08J 2433/08* (2013.01); *C08J 2333/08* (2013.01); *C08J 9/103* (2013.01); *C08J 2333/10* (2013.01); *C08J 9/0023* (2013.01); *C08J 2323/06* (2013.01); *C08J 9/0042* (2013.01); *C08J 2205/05* (2013.01); *C08J 2423/06* (2013.01); *C08J 2433/10* (2013.01); *C08J 2201/026* (2013.01)
USPC ............................ 521/143; 521/140; 521/142

(58) Field of Classification Search
CPC ............ C08J 9/0042; C08J 9/06; C08J 9/103; C08J 9/0023; C08J 2201/026; C08J 2205/05; C08J 2323/06; C08J 2333/08; C08J 2333/10; C08J 2423/06; C08J 2433/08; C08J 2433/10
USPC ................... 521/134, 142, 143, 140
See application file for complete search history.

(56) References Cited

U.S. PATENT DOCUMENTS

| 3,819,514 | A | * | 6/1974 | Clampitt et al. .............. 210/671 |
| 3,893,957 | A |   | 7/1975 | Mixon et al. |
| 3,914,501 | A |   | 10/1975 | Miller et al. |
| 4,183,984 | A | * | 1/1980 | Browers et al. ................. 428/81 |
| 4,279,848 | A | * | 7/1981 | Baxter et al. .................... 264/53 |
| 4,424,181 | A | * | 1/1984 | Senuma et al. ................. 264/54 |
| 4,489,029 | A |   | 12/1984 | Keogh et al. |
| 4,581,287 | A |   | 4/1986 | Smith et al. |
| 4,894,166 | A | * | 1/1990 | Pitts ............................. 210/663 |
| 5,100,924 | A | * | 3/1992 | Senuma et al. ................. 521/95 |
| 5,189,106 | A |   | 2/1993 | Morimoto et al. |
| 5,277,515 | A |   | 1/1994 | Hovis et al. |
| 5,290,822 | A | * | 3/1994 | Rogers et al. .................... 521/94 |
| 5,416,129 | A | * | 5/1995 | Chaudhary et al. ............. 521/79 |
| 5,589,519 | A |   | 12/1996 | Knaus |
| 5,641,847 | A |   | 6/1997 | Hozumi et al. |
| 5,859,076 | A |   | 1/1999 | Kozma et al. |
| 5,883,145 | A |   | 3/1999 | Hurley et al. |
| 5,888,604 | A |   | 3/1999 | Evans et al. |
| 5,965,030 | A |   | 10/1999 | Williams et al. |
| 6,167,790 | B1 |   | 1/2001 | Bambara et al. |
| 6,221,928 | B1 |   | 4/2001 | Kozma et al. |
| 6,242,503 | B1 |   | 6/2001 | Kozma et al. |
| 6,262,137 | B1 |   | 7/2001 | Kozma et al. |
| 6,531,520 | B1 |   | 3/2003 | Bambara et al. |
| 6,541,105 | B1 |   | 4/2003 | Park |
| 2002/0037965 | A1 |   | 3/2002 | Kinoshita et al. |
| 2003/0087976 | A1 |   | 5/2003 | Bambara et al. |
| 2004/0039072 | A1 |   | 2/2004 | Park |
| 2006/0068187 | A1 |   | 3/2006 | Krueger et al. |
| 2006/0205833 | A1 |   | 9/2006 | Martinez et al. |
| 2008/0103232 | A1 |   | 5/2008 | Lake et al. |
| 2008/0269388 | A1 |   | 10/2008 | Markovich et al. |
| 2009/0305029 | A1 |   | 12/2009 | Cushman |
| 2010/0048752 | A1 |   | 2/2010 | Vignola et al. |

FOREIGN PATENT DOCUMENTS

JP         2001213988 A  *  8/2001

OTHER PUBLICATIONS

Machine translation of JP2001-213988, Aug. 2001.*
Master of Science Thesis "Absorption Mats for Oil Decontamination" by Ugochukwu Edwin Aronu. Chemical-Environmental Engineering, University College of Boras, Sweden. Aug. 2007. Retrieved from the Internet: http://bada.hb.se/bitstream/2320/2361/1/AronuMScThesis.pdf.

* cited by examiner

*Primary Examiner* — Irina S Zemel
(74) *Attorney, Agent, or Firm* — Brian M. Dingman; Dingman, McInnes & McLane, LLP (57) ABSTRACT

A polymer composition for use in the removal and recovery of oil slicks or spills floating on the surfaces of bodies of water or present on land, such as beaches comprising a foam of a blend of polyethylene and an ethylene-alkyl acrylate copolymer and a process for using such foams in the selective removal of oil from fresh water or salt water and the recovery of the absorbed oils from the foams is disclosed. The polymer composition is also for use in other applications in which absorption of liquids is desired.

17 Claims, 7 Drawing Sheets

FIG. 1

| DENSITY | | | | |
|---|---|---|---|---|
| 0.85 | 0.89 | 0.91 | 0.924 | 0.935 |
| ELASTOMERS | PLASTOMERS | | | |
| POE (POLYOLEFIN ELASTOMERS) ESI (ETHYLENE-STYRENE INTERPOLYMERS) | VLDPE (VERY LOW DENSITY POLYETHYLENE) | LDPE (LOW DENSITY POLYETHYLENE) LLDPE (LINEAR LOW DENSITY POLYETHYLENE) | MDPE (MEDIUM DENSITY POLYETHYLENE) | HDPE (HIGH DENSITY POLYETHYLENE) |
| 45°C | 93°C | 100°C | 112°C | 120°C |
| MELTING POINT | | | | |

FOAM COMPOSITIONS FOR SELECTIVE RECOVERY OF OIL SPILLS AND OTHER APPLICATIONS

CROSS-REFERENCE TO RELATED APPLICATIONS

This application is related to U.S. Provisional Application Ser. No. 61/346,022, entitled "Foam Compositions for Selective Recovery of Oilspills", filed on May 18, 2010, which is incorporated herein by reference.

BACKGROUND

1. Field

The present disclosure relates to a method and composition for separating liquid hydrocarbon compounds from water or land, such as beaches. This disclosure also relates to a foam for the selective absorption of oil from water or land. The oil may be recovered from the foam. The foam is particularly useful for the removal of oil spills from a body of water or land.

2. Description of the Prior Art

There is considerable concern about the biological impact of oil spills and the health and economic effects upon individuals that reside and make their living from the areas surrounding the spill. Oils spills are often due to releases from tankers, barges, or from offshore drilling operations. Oil spills occur in rivers in addition to oceans, seas, gulfs, and on land. Cleaning up oil spills from the surface of the water and below the surface of the water is a challenging and costly procedure. Oil may be present on and under the surface of a body of water and on any land that the water touches. The oil damages and kills aquatic and terrestrial life, affects food sources obtained from those waters, and ruins neighboring beaches. Areas affected by oil spills are economically affected due to the inability to practice livelihoods dependent upon the waters and beaches such as fishing, shrimping, and tourism. In another embodiment, the ability to separate oil from water in an industrial environment is also useful.

Many solutions have been offered regarding compositions to clean up oil spills. Oil spills are typically partially or completely surrounded by booms. After which the oil is collected and pumped to a storage area or burned off. Recovery systems or burning off the oil are challenging due to the fact that oil spills usually cover a large area and the water is moving.

Various oil absorbing materials have been used in the past such as straw or vermiculite, sand, kieselguhr, diatomaceous earth, peat fibers, polymers, and sawdust. Such materials were spread on the oil spill and collected with the oil absorbed on or absorbed into the material. Once oil at or below the surface of water or from land is removed, there was a problem of how to dispose of the oil and/or the substances used to remove the oil from the water or land. These oil-coated materials are waste products. Another challenge to recovery of the oil is that many of the materials absorb a large amount of water. This decreases the amount of oil that the material may absorb.

It has been proposed in U.S. Pat. No. 3,819,514 to utilize a foam comprising ethylene-alkyl acrylate copolymer to selectively absorb oil from oil water mixtures. These foams require a copolymer having a minimum melt index of 800 grams/10 minutes, preferably in the range of 1000-2000 grams/10 minutes. The low molecular weight of these copolymers results in a foam of low physical properties and questionable durability to afford repeated use for absorbing oil. Furthermore, the open cell content of these foams relies upon the rheology of the copolymer during expansion as no crushing of the foam is utilized. This results in higher foam density and lower open cell content as compared to foam utilizing a crushing step in its preparation. Both of these attributes limit the foam's capability for oil absorption. As shown in the examples of U.S. Pat. No. 3,819,514, oil absorption comprises 10-13 times the foam weight.

It is desirable to provide foams having improved capacity for absorbing oil as compared to the copolymers in U.S. Pat. No. 3,819,514. It would also be desirable to provide a foam that can be utilized a plurality of times by squeezing the foam to remove absorbed oil therefrom and then reusing it for oil recovery. Furthermore, it would be desirable to provide a foam that is biodegradable so that after use it can be placed in a landfill where it will degrade.

SUMMARY

An embodiment is an open-cell foam composition comprising an open-cell foamed blend of a low density polyethylene having a density between about 0.91 and about 0.95 g/cc and a melt index between about 0.5 and about 100 g/10 minutes and an ethylene-alkyl acrylate copolymer having a melt index within the melt index range of said polyethylene. In another embodiment, the composition further comprises a biodegradation initiator. In another embodiment, the composition is used to selectively absorb oil from a mixture of oil and water.

DETAILED DESCRIPTION

The disclosure relates to a composition, method of manufacture, and method of use of an open-cell foam. It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, methods, procedures and components have not been described in detail so as not to obscure the embodiments described herein.

Figure 1:
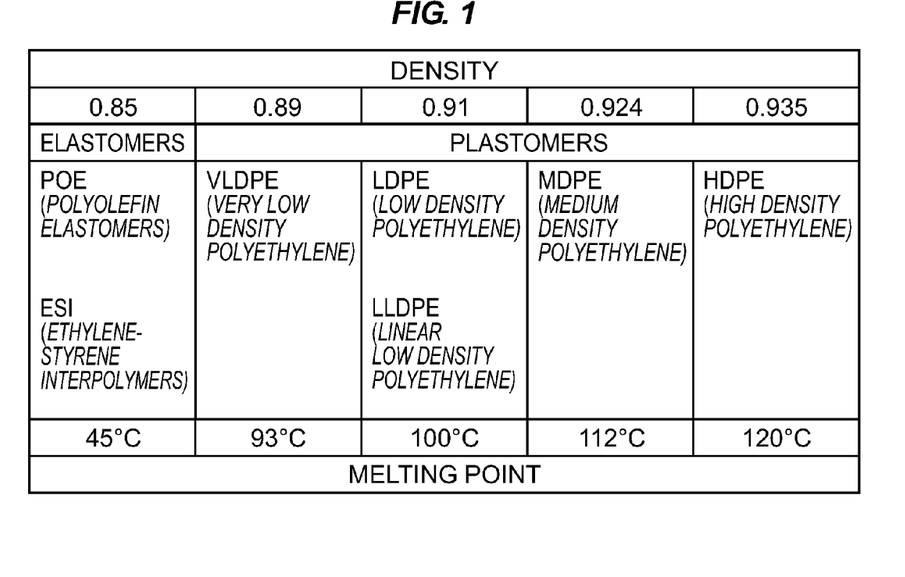
FIG. 1 is a chart illustrating examples of the density and melting point of various ethylene polymers.
Figure 2A:
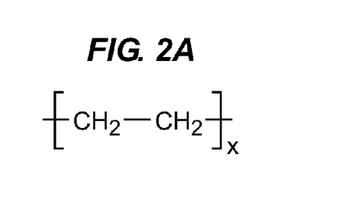
FIG. 2A illustrates the chemical structure of polyethylene.
Figure 2B:
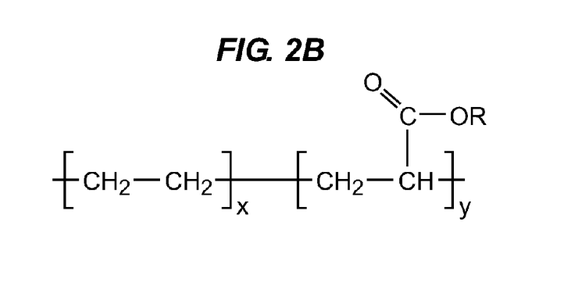
FIG. 2B illustrates the chemical structure of ethylene-acrylic ester copolymers.
Figure 2C:
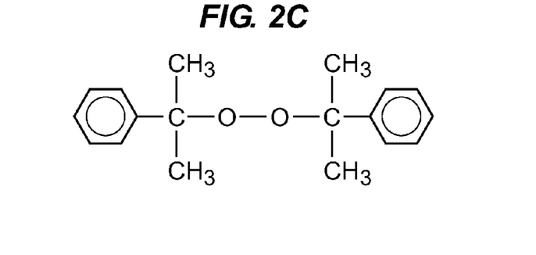
FIG. 2C illustrates the chemical structure of dicumyl peroxide.

In an embodiment, the polymer blend of this disclosure may be composed of low or medium density polyethylene with an ethylene alkyl acrylate copolymer or combination of alkyl acrylate copolymers. In an embodiment, the ethylene alkyl acrylate copolymer is selected from the group consisting of ethylene-methyl acrylate, ethylene-ethyl acrylate, and mixtures thereof. FIG. 1 illustrates exemplary values of the density and melting point of various ethylene polymers. FIG. 2 illustrates the structure of polyethylene (FIG. 2A), ethylene-acrylic ester copolymers (FIG. 2B), and a crosslinker, dicumyl peroxide (FIG. 2C).

In an embodiment, the polyethylene is selected from resins with a density between about 0.91 and about 0.950, preferably between about 0.917 and about 0.930 and most preferably between about 0.917 and about 0.923 grams/cubic centimeter (g/cc). In an embodiment, the open-cell foam composition may have a foamed density of 1.5 pounds per cubic foot. The melt index (MI) is in the range of between about 0.5 and about 100, preferably between about 0.5 and about 10 and most preferably between about 1 and about 4 grams/10 minutes (g/10 minutes) when tested to ASTM1238 using a 2160 gram weight and 190° C. temperature. Typical resins are produced by Nova Chemical, Exxon Mobil and Westlake Chemical. These resins are produced using a high pressure polyethylene process normally manufactured on either tubular or autoclave reactors.

The ethylene alkyl acrylate copolymers are preferably copolymers of ethylene and methyl acrylate or ethyl acrylate or mixtures thereof. These copolymers have alkyl acrylate content of between about 3 and about 45% based on the total weight of copolymer. Preferably the alkyl acrylate content is from between about 15 and about 25%. Melt index (MI) as measured above is similar to the polyethylene melt index. The preferred range of MI is between about 0.5 and about 4 g/10 minutes.

Blends contain between about 20 and about 80% of the copolymer or blend of copolymers, and between about 80 and about 20% of the polyethylene. The preferred range is between about 40 and about 60% copolymer, and most preferred between about 50 and about 60% copolymer.

Figure 3A:
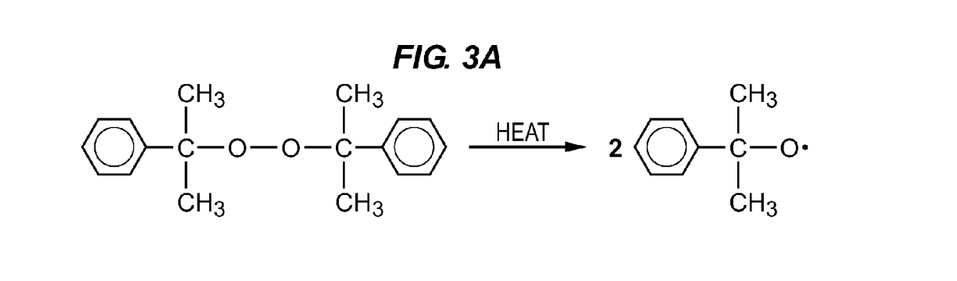
FIGS. 3A-3C illustrate crosslinking of various components of the open-cell foam composition.
Figure 3B:
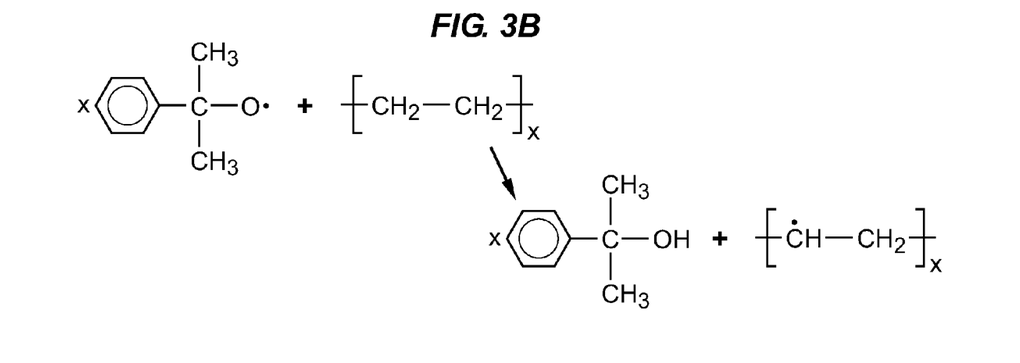
Figure 3C:
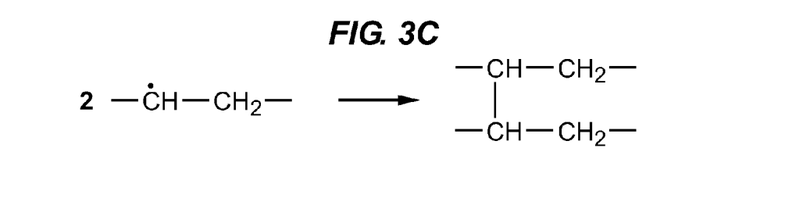

In an embodiment, a cross-linker may also be included in the formulation. A method of cross-linking employs an organic peroxide. Examples of organic peroxides include but are not limited to dicumyl peroxide, 2,5-dimethyl-2,5-di(t-butylperoxy)hexane, 1,1-bis(t-butylperoxy)-3,3,5-trimethylcyclohexane, 1,1-di-(t-butylperoxy)cyclohexane, 2,2'-bis(t-butylperoxy)-diisopropylbenzene, 4,4'-bis(t-butylperoxy) butylvalerate, t-butylperbenzoate, t-butylpaterephthalate, and t-butyl peroxide. Most preferably, the peroxide cross-linking agent is dicumyl peroxide or 2,2'-bis(t-butylperoxy) diisopropylbenzene. FIG. 3 illustrates embodiments of the cross-linking reactions. FIG. 3A illustrates decomposition of peroxide, creating active free radicals. FIG. 3B illustrates hydrogen extraction from polymer backbone. FIG. 3C illustrates formation of carbon-carbon bonds (crosslinks) between adjacent polymer chains.

In an embodiment, suitable chemical crosslinking agents include organic peroxides, silanes, vinyl monomers, organo-titanates, organo-zirconates, and p-quinone dioximes.

In an embodiment, the cross-linked polymer blend can be grafted. In another embodiment, the cross-linked polymer is not grafted. Grafting involves attaching monomer(s) or polymer(s) to the original polymer resin chains. The grafting is generally accomplished by forming active grafting sites on the original polymer chains in the presence of monomers that can further polymerize as branches from the original polymer chains. Acting grafting sites can be generated, for example, by free radicals or anions. A graft can include other monomers, such as di and tri-allyl cyanurates and isocyanurates, alkyl di- and tri-acrylates and methacrylates, zinc dimethacrylates and diacrylates, styrenes, divinylbenzene, vinyl silanes with at least two hydrolysable groups, and butadiene. Silane-grafted polymer blends can be cross-linked by reaction with moisture. The polymer blend may also be grafted with maleic anhydride to modify the absorption properties.

In an embodiment, a polyolefin elastomer, such as Engage™, or equivalent, may be included in the composition. In an embodiment, the polyolefin elastomer is a metallocene polymer. In an embodiment, metallocene polymers such as Engage™ may be included in the composition. Polyolefin elastomers are modifiers that provide improvements in impact strength and other properties. In an embodiment, a portion or all of the ethylene-alkyl acrylate may be replaced with a metallocene polymer.

In an embodiment, unimpregnated polyethylene-polystyrene (UPES) may be included in the formulation. UPES is compatible with various polymers and improves processability. UPES may provide additional flexibility, improved melt strength, increased temperature range, density potential, and source reduction.

In an embodiment, chemical foaming agents may be included in the formulation. Chemical foaming agents may include, for example, azodicarbonamide, p-p'-oxybis(benezene)sulfonyl hydrazide, p-toluenesulfonyl semicarbazide, 5-plienyltetrazole, ethyl-5-phenyltetrazole, dinitrosopentamethylenetetramine, and other azo, N-nitroso, semicarbazide, sulfonyl hydrazides, carbonate, and bicarbonate compounds that decompose to form a gas when heated. The preferred foaming agents are chemical foaming agents, such as azodicarbonamide. Maleic anhydride can be added to the blend to increase the polarity of the blend composition to further improve oil absorption.

In an embodiment, additional additives may be included. Additives may include inert fillers such as calcium carbonate, talc, zinc oxide, or the like. These fillers can serve to lower the ultimate elongation of the foam walls, yielding easier crushing tendency. Silicone oil also can be added to modify the integrity of the cell wall and to create an even cellular structure. In an embodiment, Zinc stearate may be included to act as a foaming agent activator. In an embodiment, stearic acid may be used as a releasing agent.

Figure 4A:
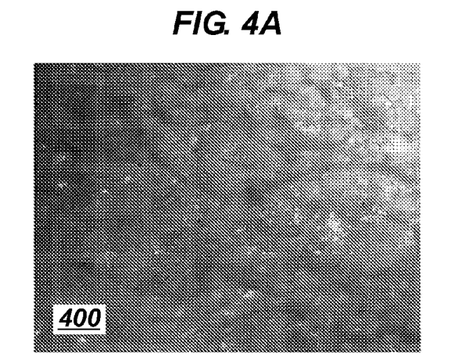
FIG. 4A illustrates the structure of the open-cell foam composition in the absence of a biodegradable additive 400.
Figure 4B:
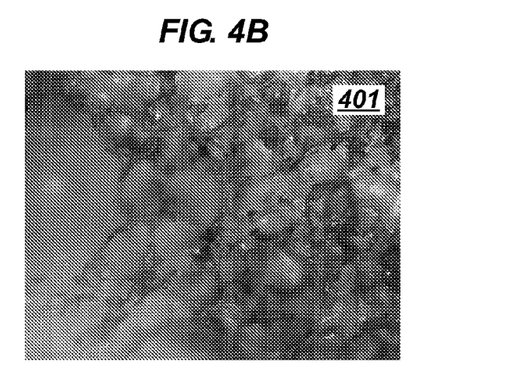
FIG. 4B illustrates the structure of the open-cell foam composition in the presence of a biodegradable additive 401.

A biodegradable additive may be included in the formulation. In an embodiment, a suitable biodegradable additive is SR2003 from Sierra Resins. This additive has a biodegradation initiator that aids in the creation of enzymes that can digest the polymer. In an embodiment, the additive is Bio-Tec's EcoPure. EcoPure is a combination of organic compounds and nutrients that attract microorganisms that metabolize polymers. FIG. 4A depicts the open-cell foam without a biodegradable additive 400. FIG. 4B depicts the open-cell foam including a biodegradable additive 401. FIGS. 4A and 4B illustrate the open-cell foam in the absence and presence of the biodegradable additive respectively.

A biocide may be included in the formulation. In an embodiment, the biocide aids in the clean-up and treatment of algae, bacteria, and fungi in water or other environment. In an embodiment the biocide containing open-cell foam is used to purify water. In various embodiments, the biocide may be quaternary ammonium compounds, hypochlorite, sodium dichloro-s-triazinetrione, trichloro-s-triazinetrione, hydantoin, or mixtures thereof. In an embodiment, the biocide may be incorporated into the formulation and an integral part of the open-celled foam. In an embodiment, that biocide is HM1400 from Biosafe®. HM4100 is a broad spectrum antimicrobial additive. In an embodiment, the biocide is adsorbed on the surface of the foam structure in a secondary step.

Other additives, alone or in combination, can be added to the foam compositions including antioxidants (e.g., hindered phenolics such as Irganox 1010, phosphates such as Irgafos 168, or polymerized trimethyl-dihydroquinolines such as Agerite AK, Resin D or Flectol H), ultra-violet stabilizers, thermal stabilizers, antistatic components, flame retardants, dyes, pigments or colorants, and other processing aids. In an embodiment, a green colorant is added to the foam composition. In an embodiment, the green colorant is phthalocyanine green. Organic or inorganic dyes or colorants may be used.

The present disclosure provides an open-cell foam formed from a blend of low density polyethylene and an ethylene-alkyl acrylate copolymer. An open-cell foam has an interconnecting cell structure. The foams of this disclosure are prepared by mixing the polyethylene and copolymer with a foaming agent, cross-linker and any desired additive such as a biodegradation initiator or colorant. The cross-linker effects cross-linking of the blend of polyethylene and copolymer. The mixture is then directed to a mold under high pressure where the mixture is subjected to heat and pressure where the cross-linking is initiated. The mixture then is directed to a second step expansion chamber where it is steam heated and water cooled. There is no direct contact with the heating and cooling fluids. In this step the foaming agent decomposes into a gas while cross-linking is continued. The foam mixture is then cooled and removed for further processing. The foam is then crushed to puncture its skin and then compressed to break the closed cells. The foam then optionally can be punctured with needles to increase the open cells. The resultant foam is useful for selectively absorbing oil from water and, after compressing the foam, the oil is recovered from the foam and the foam can be reused. In an embodiment, the foam may be reused up to 100 times.

Figure 5:
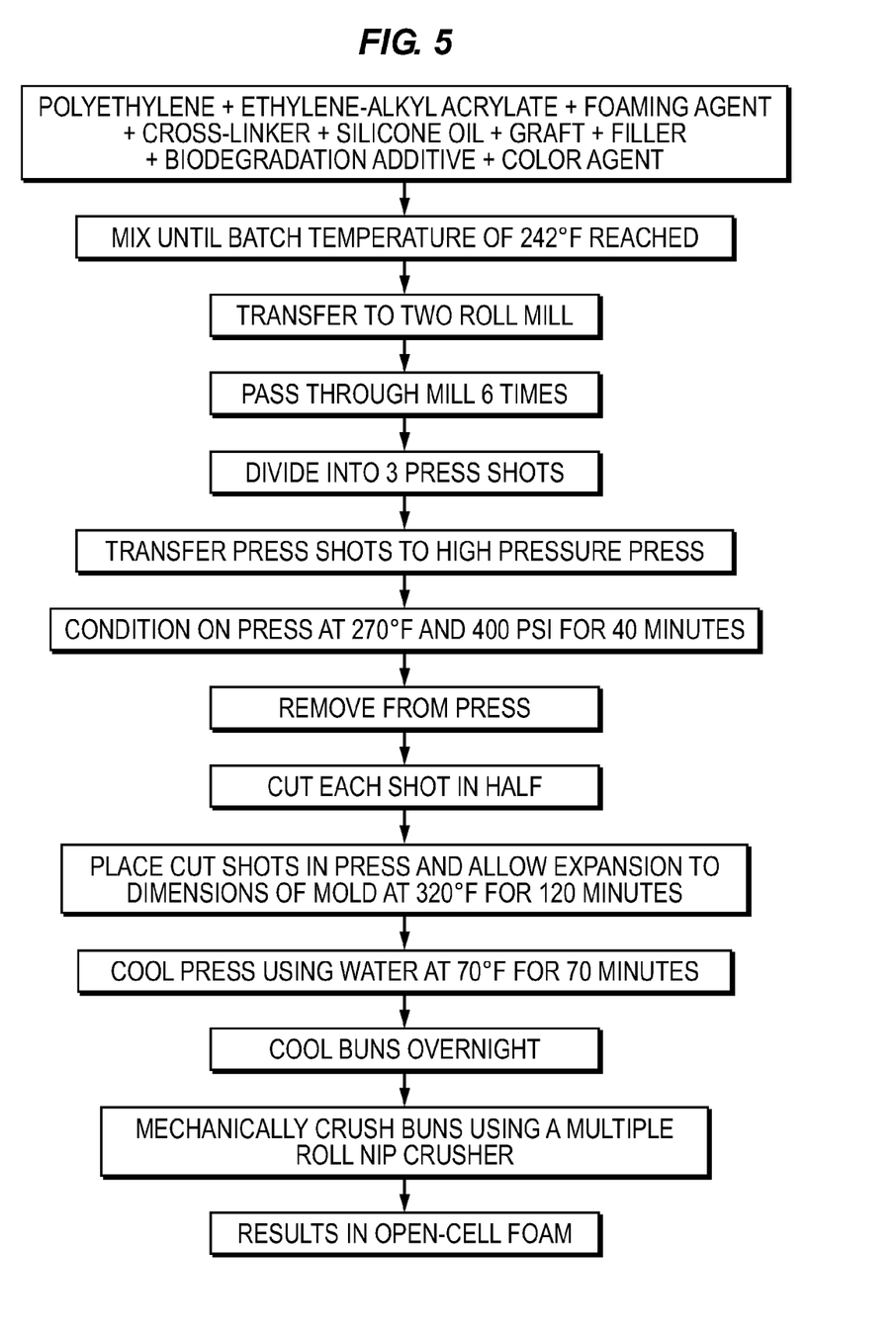
FIG. 5 is a diagram of a method of manufacturing the open-cell foam composition.

Production of the open-cell foam composition may be effected in a multi-step process. FIG. 5 illustrates an embodiment of a method of manufacturing the open-cell foam composition. FIG. 5 is not meant to be limiting as the method may be varied from that illustrated in FIG. 5. While the method has been described in terms of embodiments, it will be apparent to those of skill in the art that variations may be applied to the method and in the steps or in the sequence of steps of the methods described herein without departing from the concept, spirit and scope of this disclosure. In the first step, the blend of polyethylene and ethylene-alkyl acrylate copolymer and desired additives including a foaming agent and a cross-linker for the blend are mixed in a mixing apparatus such as a dispersion mixer at a temperature below the decomposition temperatures of both the foaming agent and cross-linker. In an embodiment, a green colorant may be added.

The polymer then is pressed in an apparatus such as a two roll mill to further disperse the polymer mixture and remove entrained air, to produce a preformed blend suitable for subsequent processing. Alternatively, the mixture may be processed in an extruder to complete mixing, remove entrained air, and produce a preformed blend suitable for subsequent processing.

The resultant blend is divided into sections of predetermined weight and may be preformed in shape using a low pressure press apparatus. This step is not necessary in the case of an extruded blend where the blend is cut to predetermined weight as it exits the extruder. The blend needs to have a volume sufficient to accommodate subsequent processing apparatus.

Preformed volumes of the resultant polymeric compositions referred to in the art as "shots" are loaded into a first stage high pressure apparatus such as a press, where they are subjected to heat and pressure, and the cross-linking is initiated. Foaming does not occur in this press. The shots are removed from the first stage press and placed in a second stage press. This press is steam heated and water cooled. Heating can be controlled by accurate steam pressure control and equal distribution throughout the surface of the platens in the box. Cooling can be controlled by high coolant flow and equal distribution of coolant throughout the platen surfaces.

The second stage press contains one or a plurality of cavities each of which is essentially a box which is steam heated and water cooled. The shot is smaller than the limits of the box, and the steam heat decomposes the chemical foaming agent to form a gas and continues the cross-linking reaction, and the shot mass expands to the limits of the box. The steam is then shut off and the cooling water is introduced through the coils.

At the end of the cooling cycle, the completed polymeric foam products ('buns") are removed from the press for further processing. The foam structure at this point in the process is predominantly closed cell and mechanical crushing of the buns opens the cells. The buns are crushed by first puncturing the skin of the bun by mechanical means such as by using rollers with pins or teeth. The bun is then compressed between pressure rollers continuously to break the cells within the bun. This opening of the cells promotes maximum oil absorption capability of the polymeric foam product since any closed cell precludes absorption of oil. It has been found that optional additional puncturing of the material using needle punching increases the absorbency of the foam. The needle punching may performed as part of the mechanical crushing by rollers or be performed at a different time.

In an embodiment, the open-celled foam is capable of absorbing oil, fuels, lubricants, liquid hydrocarbons, or crude oil. The open-cell foam works as an absorbent. An absorbent allows a substance to enter it, i.e., it takes in another substance. With an adsorbent, the substance is adhered to the surface of the adsorbent. As the open-cell foam works as an absorbent, it holds the liquid hydrocarbons even in strong ocean currents. The open-celled foam absorbs approximately 33 times its weight in hydrocarbons without absorbing substantial amounts of water. Oil stays in the foam because of polarity. The open-celled foam may also remove dispersants. An example of a dispersant COREXIT® by Nalco. The open-celled foam removes oil on and below the surface of water. In an embodiment, the open-celled foam removes oil sheen. It is desirable to have a product that removes oil sheen as that has been a challenge in the art. In an embodiment, the open-celled foam removes oil plumes. In an embodiment, the open-celled foam detects the presence of oil at or below the surface of the water.

Figure 7:
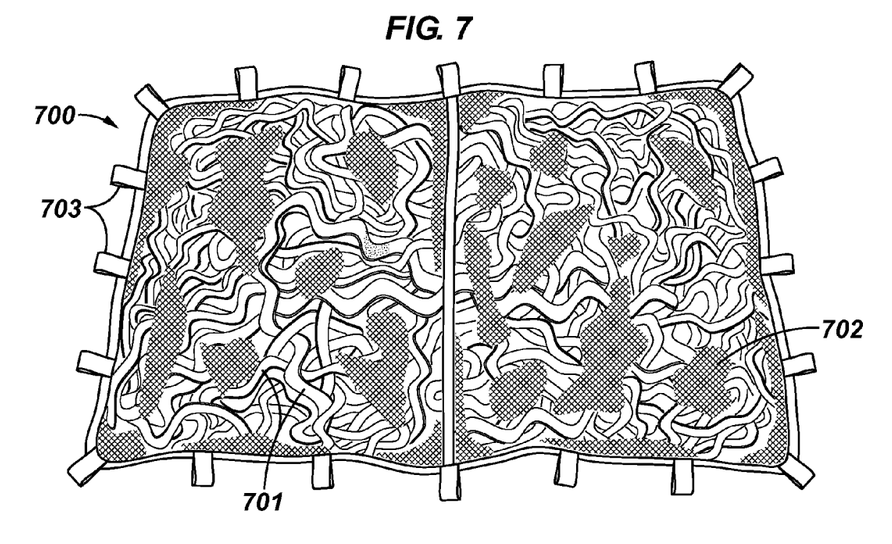
FIG. 7 illustrates strips 701 of open-cell foam composition in a netpack 700.
Figure 8A:
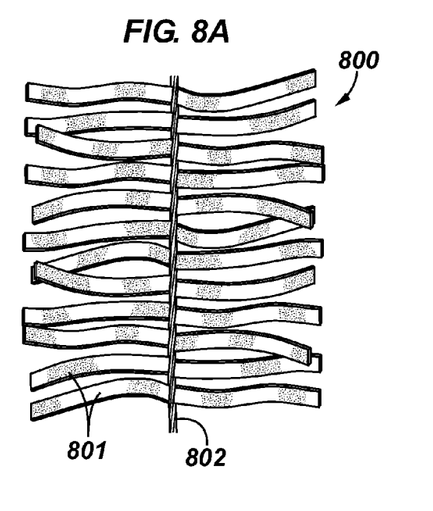
FIGS. 8A and 8B illustrate pom-poms 800 and 803 of the open-cell foam composition.
Figure 8B:
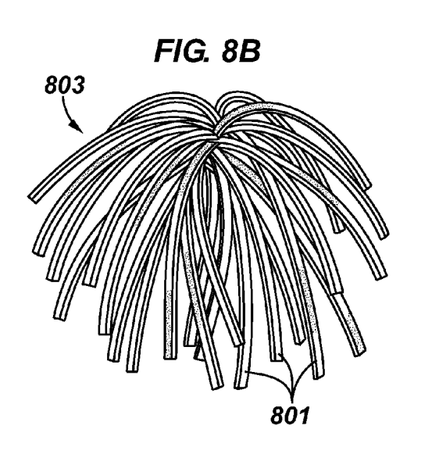

The open-celled foam floats on the surface of the water but can be weighted down for hydrocarbon removal below the surface. In another embodiment, the open-celled foam may be weighted or secured to structures to maintain its position under the surface of the water. In an embodiment, the open-celled foam is attached to structures with sinkers or weights to stay submerged. In another embodiment, the open-celled foam is attached to hard booms. In an embodiment, the open-celled foam may be placed in the bilges of ships to absorb oil. In an embodiment, the oil may be present in the ship's bilge due to the ship's bilge pump contaminating the bilge with oil. In an embodiment, the submerged open-celled foam is used for detection and clean-up of oil plumes beneath the surface of the water. In an embodiment, the open-celled foam will be tested after submersion to determine whether hydrocarbons are present. In an embodiment, the plume is a hydrocarbon plume. In an embodiment, the plume is a contaminant plume. In an embodiment, the water is fresh water. In an embodiment, the water is salt water. In an embodiment, the open-celled foam is submerged for 24 hours to detect hydrocarbons below the surface of the water. In an embodiment, the open-celled foam is submerged about 40 feet below the surface of the water. In an embodiment, a bouy is attached to the weighted open-celled foam to indicate it location. In an embodiment, the submerged soft-celled foam is a pom-pom 800 or 803. In another embodiment, the submerged soft-celled foam is a netpack 700.

Figure 6A:
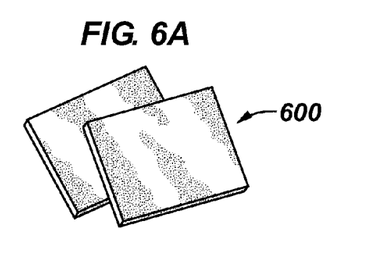
FIG. 6A illustrates blocks 600 of the open-cell foam composition.
Figure 6B:
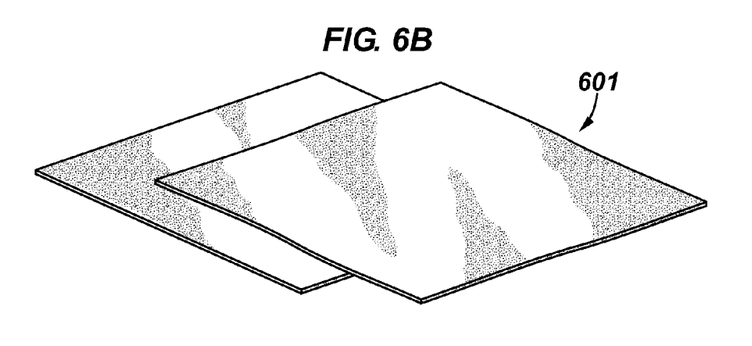
FIG. 6B illustrates pads 601 of the open-cell foam composition.
Figure 13A:
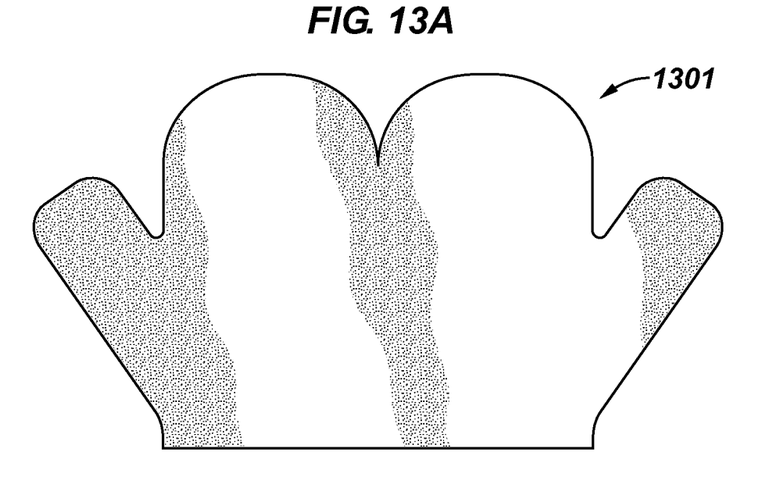
FIG. 13A illustrates an open-cell foam mitt prior to folding and sewing 1301.
Figure 13B:
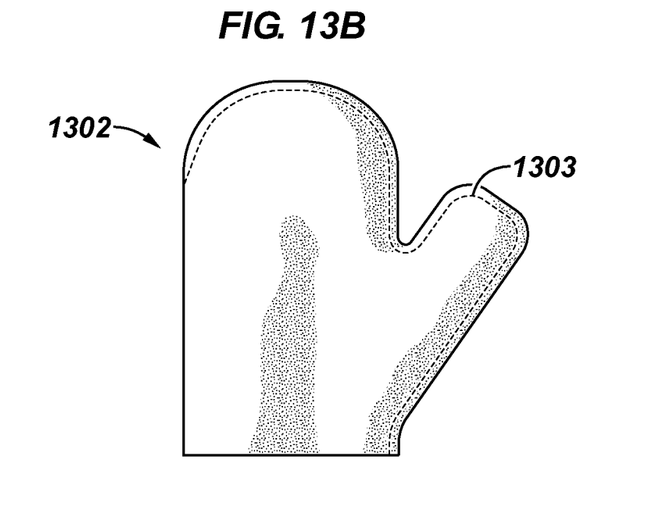
FIG. 13B illustrates an open-cell foam mitt 1302 with stitching 1303.

In an embodiment, the open-celled foam is formed into including but not limited to a boom 900 (FIGS. 9A and 9B), mop 1000 (FIG. 10A), coastal mop 1001 (FIG. 10B), snare boom, sock, sheet, mat, sweep, block 600 (FIG. 6A), pad 601 (FIG. 6B), wipe, strip 701, mitt 1302 (FIG. 13B), pom-pom 800 and 803 (FIGS. 8A and 8B), or pillows. FIG. 6A depicts a block 600 of the open-cell foam. FIG. 6B depicts a pad 601. The foam may be placed within a structure such as a net to form including, but not limited to, a netted boom 903 (FIG. 9C) or netpack 700 (FIG. 7). FIG. 7 depicts a netpack 700 in which a net 702 surrounds strips 701 of the open-celled foam. The netpacks 700 may optionally include D rings 703. Netpacks 700 may be used as a submergible plume scrubber. In an embodiment, the net 702 is comprised of heavy denier polypropylene or an extruded polypropylene. In an embodiment, a netted boom 903 is comprised of a net 904 surrounding the boom 900. The netted boom 903 may optionally include D rings. In an embodiment, a high surface area netted boom is formed from a mesh tube filled with foam strips. Increased surface area of the open-cell foam structures provides more efficient oil absorption. In an embodiment, the mesh tube is hex pattern 112 strand (500 denier) 2 stitch net. In an embodiment, steel rings or a rope clinch rings may be attached to the side or end of the high surface area netted boom. In an embodiment, carabiners or rings are attached to the steel rings or rope clinch rings. In an embodiment, a rope is attached to the ring attached to the rope clinch ring. Pom poms 800 and 803 may vary in size. In an embodiment, the open-celled foam pieces 801 are adhered together on a rope 802. In an embodiment, booms 900 may be connected together through holes 901 at each end of the boom with a rope 902 to form a longer section of boom. Mops 1000 may be used individually or fastened to a rope 1002 or other fastening means known in the art and attached to posts 1003 to form a coastal mop 1001. The coastal mop 1001 may contain one or multiple ropes 1002 with mops 1000 fastened to the ropes 1002. The posts 1003 of the coastal mop 1001 are placed in the ground on the beach to a depth satisfactory to maintain the position of the coastal mop 1001. FIG. 13A illustrates a mitt prior to folding and sewing 1301. FIG. 13B illustrates the mitt 1302 with stitching 1303. In an embodiment, the mitt 1302 may be used as shown in FIG. 13B. In another embodiment, the mitt 1302 may be turned inside out.

Figure 9A:
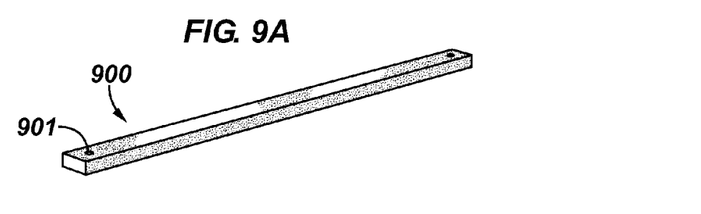
FIG. 9A illustrates a boom 900 of the open-cell foam composition.
Figure 9B:
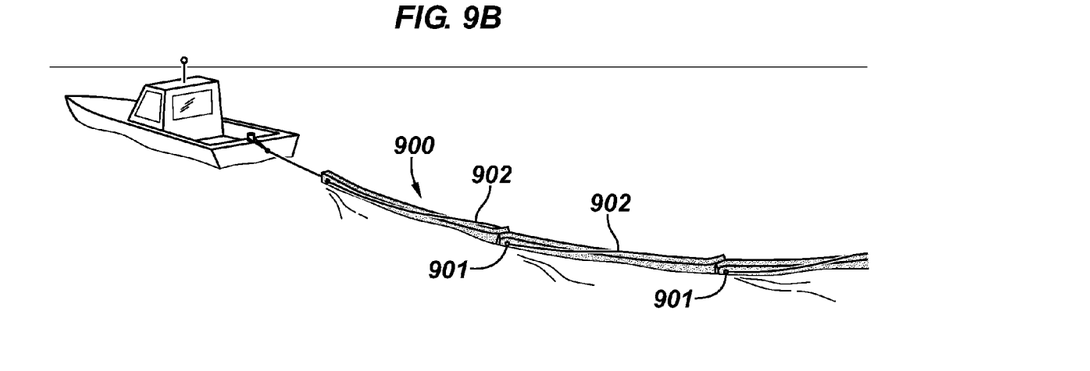
FIG. 9B illustrates booms 900 of the open-cell foam composition connected together.
Figure 9C:
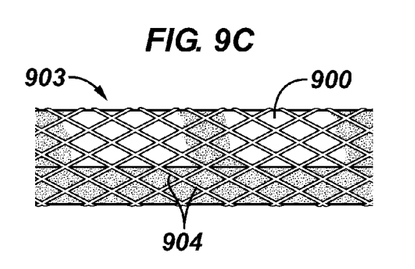
FIG. 9C illustrates a netted boom 903.
Figure 10A:
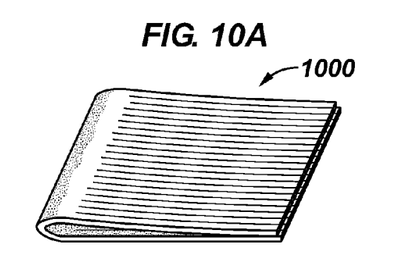
FIG. 10A illustrates a mop 1000 of the open-cell foam composition.
Figure 10B:
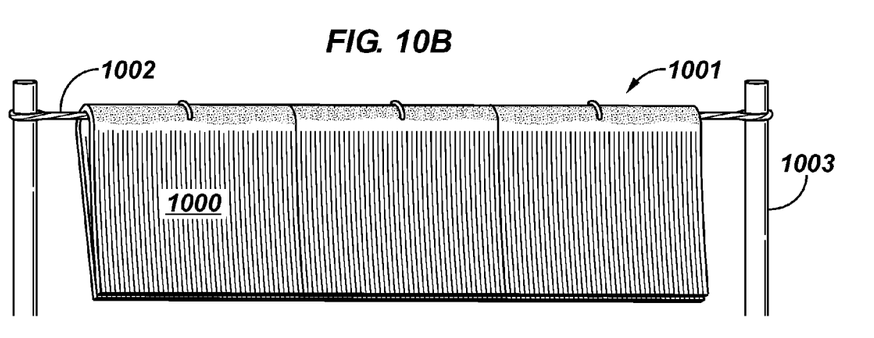
FIG. 10B illustrates lines of mops 1000 to be attached to a post 1003 on each side to form a coastal mop 1001 of the open-cell foam composition.

The open-celled foam may be used in various dimensions. In one embodiment, a sweep may be ¾"×16"×36". In other embodiments, the pads may be ¼"×16"×18" and ½"×16"×18". In an embodiment, a netted structure may be 3"×6', 4"×18', 6.5"×18', or 4"×72". In an embodiment, the boom 900 sections are 3"×4"×72". The booms 900 may be connected with rope 902 or other method of fastening known in the art. In an embodiment, coastal mops 1001 are comprised of two lines of mops 1000 strung between two posts 1003. In an embodiment, a marsh scrubber boom with no netting has dimensions of 3"×4"×72" and has ¾" holes in each end. In an embodiment, the high surface area netted boom is a 5" diameter mesh tube measuring 144" filled with two bundles of 20 strips of open-cell foam in each bundle. In an embodiment, the bundles are end-to-end. In an embodiment, each open-cell foam strip measures 72"×1"×0.5". In an embodiment, the steel rings are located on the side of the high surface area netted boom at a distance of 9" from the end. In another embodiment, a surf scrubber boom with heavy denier polypropylene netting is 4" diameter round×72" length with D rings for attaching every 36" or 3 D rings per boom. The surf scrubber boom is designed for beaches with heavy surf and/or strong current and in support of containment booms. In an embodiment, a wave scrubber boom for light surf with extruded polypropylene netting is 4" diameter×18' for each boom. The wave scrubber boom has D rings for attachment every 6'. In another embodiment, a large diameter wave scrubber boom with extruded polypropylene netting is 6.5" diameter×18' for each boom. The large diameter wave scrubber boom has D rings for attachment every 6'. In another embodiment, metal rods may be inserted into the open-cell foam to make continuous sheets in unlimited lengths to remove oil plumes. In an embodiment, the mitt 1302 is 9.25" in length and 8.8" in width.

Figure 11:
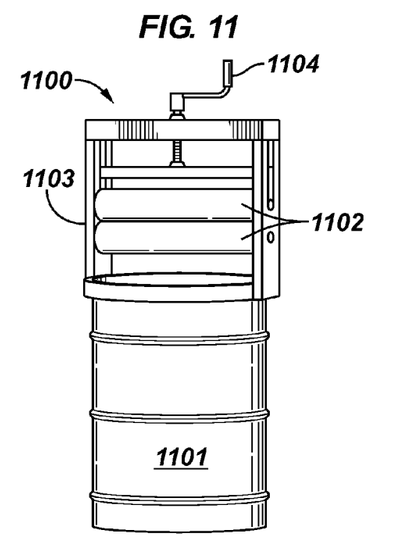
FIG. 11 illustrates a wringer assembly 1100 for removal and recovery of oil from the open-cell foam composition.
Figure 12:
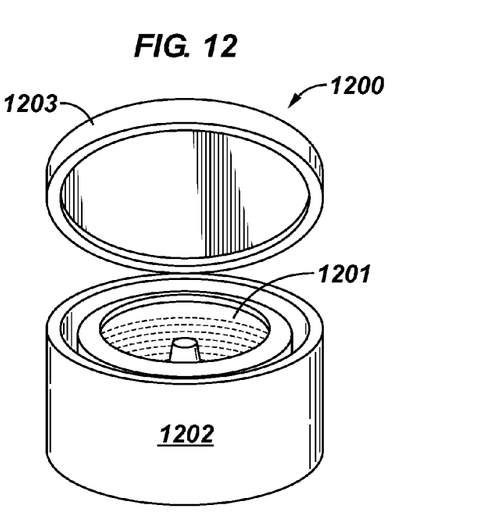
FIG. 12 illustrates a centrifuge 1200 for removal of oil from the open-cell foam composition.

The open-celled foam is reusable. The hydrocarbons can be removed from the open-cell foam by gloved hands, wringer rollers 1102, a press, a centrifuge 1200, or any other method known in the art for removing liquid. FIG. 11 illustrates a wringer assembly 1100 for use in squeezing out hydrocarbons such as oil. The hydrocarbon is collected in the barrel 1101 below the wringer rollers 1102. The wringer rollers 1102 are present in a wringer frame 1103. When handle 1104 is rotated, the wringer rollers 1102 rotate and squeeze the hydrocarbons from the open-celled foam. The hydrocarbons accumulate in the barrel 1101. Hydrocarbons recovered from the open-cell foam can be recycled, used as a free fuel, incinerated, or any other use or method of disposal known in the art. FIG. 12 depicts a centrifuge 1200 for spinning the oil from the open-cell foam. The centrifuge 1200 includes a rotor 1201 that spins causing the oil to be removed from the open-cell foam. The centrifuge also includes a body 1202 and lid 1203.

The open-celled foam optionally contains a bioremediation initiator. The open-celled foam is resilient and may be used up to 100 times and can be thrown away as it will naturally biodegrade in a landfill environment. In an embodiment, the open-celled foam degrades in approximately 5 to 8 years. The open-celled foam can be easily incinerated, does not emit any noxious fumes when burned, and leaves a minimal non-toxic ash.

The open-celled foam is light and easily deployed. In various embodiments, the open-celled foams may be deployed by boat, helicopter, barge, land vehicle, or on foot.

The open-celled foam may also be used to absorb other substances than hydrocarbons. The open-cell foam may be used in various applications to absorb a liquid and apply it to a surface. The open cell structure of the foam creates capillary action that works to absorb a liquid. The liquid can then be applied to the desired surface by exerting pressure on the open-cell foam.

In an embodiment, the open-celled foam may be used as a non-vinyl acetate drug delivery system. In an embodiment, the open-celled foam is used to apply a drug in liquid, lotion, cream, or gel form. In an embodiment, the open-celled foam is used in other medical applications. In an embodiment, the open-celled foam is used to absorb liquids from a surface.

In an embodiment, the open-cell foam may be used to apply paint, stains, sealants or similar substance. In an embodiment, the open-cell foam is used as a component of a paint roller or paint brush.

EXAMPLES

The following examples are included to demonstrate preferred embodiments of the present disclosure. It should be appreciated by those of skill in the art that the techniques disclosed in the examples which follow represent techniques discovered by the inventors to function well and thus can be considered to constitute preferred modes for its practice. However, those of skill in the art should, in light of the present disclosure, appreciate that many changes can be made in the specific embodiments which are disclosed and still obtain a like or similar result without departing from the spirit or scope of the disclosure. The following Examples are offered by way of illustration and not by way of limitation.

Example 1

The following formulation and process conditions were used:

TABLE 1

| Component | phr (parts per hundred rubber) |
| --- | --- |
| (PE) Resin 1 | 44 |
| Ethylene-Methyl Acrylate Resin 1 | 56 |
| Azodicarbonamide | 18 |
| Dicumyl Peroxide –40% active on Kaolin clay | 1.55 |
| Silicone Oil | 0.9 |
| Zinc Stearate | 0.3 |
| Zinc Oxide | 0.1 |
| Calcium Carbonate | 20 |
| SR2003 Biodegradation additive | 1 |
| Green Color Concentrate | 3.5 |

The ingredients were mixed in the dispersion mixer at a total weight of 155.5 pounds. FIG. 5 illustrates one embodiment of a method of manufacture of the open-cell foam. In other embodiments, the method may be varied. The mixing was continued until a batch temperature of 242° F. was reached, and the mixture was transferred to a two roll mill with roll temperatures of 280° F. and 275° F. The material was passed through the mill 6 times to remove air and finish the mixing process. The batch was evenly divided into 3 press shots and preformed in a low pressure press.

The press shots were transferred to the high pressure press. The temperature was 270° F. and the pressure on the ram was 400 PSI. The material was conditioned in the press for 40 minutes at these conditions and then removed. Each press shot was cut in half to form 6 press shots for the secondary expansion. These shots were placed in the press and allowed to expand freely to the dimensions of the mold. The temperature of the press was 320° F. The expansion time was 120 minutes. After the expansion was complete, the press was cooled using water at 70° F. and the cooling cycle was 70 minutes. The resulting buns were 4.5 inches in thickness, and 50 inch×75 inches. The buns were cooled overnight and mechanically crushed using a multiple roll nip crusher to rupture the cells. Resulting buns yielded 3.5 inches of open-celled foam after the top and bottom skins were removed. The resultant foam had an average cell size of 0.65 mm and a density of 1.7 pounds per cubic foot (pcf). One gram per cubic centimeter equals 62.4269 pounds per cubic foot. The physical properties of the foam were determined according to ASTM D3575. The resulting physical properties of the foam are included in Table 3 and Table 4.

Example 2

The following formulation and process conditions were used:

TABLE 2

| Component | phr (parts per hundred rubber) |
| --- | --- |
| (PE) Resin 2 | 44 |
| Ethylene-Methyl Acrylate Resin 2 | 56 |
| Azodicarbonamide | 18 |
| Dicumyl Peroxide –40% active on Kaolin clay | 1.55 |
| Silicone Oil | 0.9 |
| Zinc Stearate | 0.3 |
| Zinc Oxide | 0.1 |
| Calcium Carbonate | 20 |
| SR2003 Biodegradation additive | 1 |
| Green Color Concentrate | 3.5 |

Using the same processing temperatures as in Example 1 and lowering the shot size into the high pressure press from 52 to 48 pounds, the resultant foam had an average cell size of 1.4 mm and a density of 1.6 pounds per cubic foot (pcf). One gram per cubic centimeter equals 62.4269 pounds per cubic foot. The resulting physical properties of the foam are included in Table 3 and Table 4.

Example 3

Physical properties of formulations in Example 1 and Example 2

TABLE 3

| Property | Units | Example 1 | Example 2 |
|---|---|---|---|
| Density | pounds per cubic foot | 1.7 | 1.6 |
| Tensile Strength | pounds per square inch | 22 | 17 |
| Elongation at break | % | 217 | 183 |
| 25% compression deflection | pounds per square inch | 0.3 | 1.1 |
| 50% compression deflection | pounds per square inch | 0.7 | 3.6 |
| Compression Set | % | | |
| Tear Strength | pounds per lineal inch | 6 | 6 |
| Average Cell size | mm - by ocular | 0.65 | 1.4 |

TABLE 4

| Resin ID | Type | Melt index | Density | % acrylate |
|---|---|---|---|---|
| PE1 | polyethylene | 2.3 | 0.918 | 0 |
| PE2 | polyethylene | 2.2 | 0.919 | 0 |
| alkyl acrylate resin 1 | ethylene methyl acrylate copolymer | 2.0 | 0.941 | 20 |
| alkyl acrylate resin 2 | ethylene methyl acrylate copolymer | 2.1 | 0.944 | 24 |

Example 4

Testing was conducted in accordance with ASTM D3575-08, Standard Test Methods for Flexible Cellular Materials Made from Olefin Polymers.

TABLE 5

| Test | Units | Open-cell foam |
|---|---|---|
| Density | pcf | 2.0 |
| | kg/m3 | 32.0 |
| Tensile strength | psi | 20 |
| | kpa | 138 |
| Elongation | % | 235 |
| Compression resistance 25% | psi | 0.3 |
| | kpa | 2.07 |
| Compression resistance 50% | psi | 0.6 |
| | kpa | 4.14 |
| Compression set | % | <7 |
| Tear resistance | pli | 5 |
| | N/mm | 0.9 |
| Hardness durometer | OO | 18 |

Example 5

Oil absorption testing using SAE 30 motor oil and SAE 90 weight gear oil: Three samples of foam approximately 3 inches×3 inches×¼ inches were used for each test. The samples were floated on the oil surface for approximately 6 hours. The samples were not squeezed or manipulated during the test. The samples were weighed before and after the test. The samples were pressed to a thickness of approximately 0.015 inch to remove oil. The sample was placed between two polyethylene plates and squeezed using a mechanical vise. The samples were doubled over and re-squeezed and weighed. The samples were immediately returned to the oil. The samples were removed from the oil after approximately 6 hours and weighed. The squeezing procedure was repeated and the samples were reweighed. The samples were returned to oil for a third time for 24 hours to determine maximum oil absorption. The oil was allowed to drip from the sample for approximately one minute prior to weighing so that only retained oil was included in the weight measurement. The weight factor is the ratio of the sample plus oil to the original weight of the sample. The foam can absorb as much as 33 times its own weight in oil. Table 6 and Table 7. Wt.=weight.

TABLE 6

| Oil type | Sample | Orig. wt. | Wt. after 1st soak | Wt. factor | Wt. after oil removal | Wt. after 2nd soak | Wt. factor | Wt. after oil removal | Wt. after 3rd soak | Wt. factor |
|---|---|---|---|---|---|---|---|---|---|---|
| SAE 30 | A | 1.19 | 16.58 | 13.9 | 3.02 | 31.16 | 26.2 | 3.61 | 37.39 | 31.4 |
| SAE 30 | B | 1.16 | 17.13 | 14.8 | 3.09 | 35.04 | 30.2 | 4.62 | 38.92 | 33.6 |
| SAE 30 | C | 1.11 | 15.43 | 13.9 | 2.58 | 34.48 | 31.1 | 4.47 | 36.35 | 32.7 |
| Average | | | | 14.2 | | | 29.2 | | | 32.6 |

TABLE 7

| Oil type | Sample | Orig. wt. | Wt. after 1st soak | Wt. factor | Wt. after oil removal | Wt. after 2nd soak | Wt. factor | Wt. after oil removal | Wt. after 3rd soak | Wt. factor |
|---|---|---|---|---|---|---|---|---|---|---|
| SAE 90 | A | 1.28 | 15.71 | 12.3 | 3.43 | 36.1 | 28.2 | 6.88 | 38.4 | 30.0 |
| SAE 90 | B | 1.33 | 15.01 | 11.3 | 4.21 | 31.5 | 23.7 | 7.09 | 36.1 | 27.1 |
| SAE 90 | C | 1.30 | 19.05 | 14.7 | 3.83 | 28.0 | 21.5 | 7.64 | 35.5 | 27.3 |
| Average | | | | 12.7 | | | 24.5 | | | 28.1 |

Example 6

Oil absorption testing using SAE10W-30 motor oil: The foam was floated on the surface of an SAE10W-30 motor oil bath as in Example 3. One set of samples was crushed in a vise prior to exposure to oil and the other was not. Oil was removed by wringing the samples by hand rather than by squeezing in a vise. The first cycle was 1.5 hours and the second was 30 minutes. Table 8 and Table 9. Wt.=weight.

TABLE 8

| Oil type crushed | Sample | Original wt. | Wt. after 1st soak | Wt. factor | Wt. after oil removal | Wt. after 2nd soak | Wt. factor |
|---|---|---|---|---|---|---|---|
| SAE 10W-30 | A | 1.12 | 26.38 | 23.6 | 4.45 | 28.41 | 25.4 |
| SAE 10W-30 | B | 1.1 | 26.17 | 23.8 | 4.86 | 29.00 | 26.4 |
| SAE 10W-30 | C | 1.08 | 23.75 | 22.0 | 5.0 | 27.44 | 25.4 |
| Average | | | | 23.1 | | | 25.7 |

TABLE 9

| Oil type uncrushed | Sample | Original wt. | Wt. after 1st soak | Wt. factor | Wt. after oil removal | Wt. after 2nd soak | Wt. factor |
|---|---|---|---|---|---|---|---|
| SAE 10W-30 | A | 1.17 | 27.78 | 23.7 | 3.79 | 28.65 | 24.5 |
| SAE 10W-30 | B | 1.09 | 25.64 | 23.5 | 2.68 | 25.49 | 23.4 |
| SAE 10W-30 | C | 1.11 | 25.97 | 23.4 | 3.92 | 26.18 | 23.6 |
| Average | | | | 23.6 | | | 23.8 |

Example 7

TABLE 10

| Weight of sample before exposure | 1.88 |
|---|---|
| Weight of sample plus absorbed oil | 36.43 |
| Weight of oil absorbed | 34.55 |

TABLE 11

| Weight of oil added to water | 10.12 grams |
|---|---|
| Weight of sponge | 4.81 grams |
| Weight of sponge plus oil | 14.17 grams |
| Weight of oil recovered | 9.36 grams |
| % of oil recovered | 92.5% |

Example 8

Removal of liquid hydrocarbons from the surface of water: A pad of the open-celled foam was placed on the surface of the water in need of liquid hydrocarbon removal. The open-celled foam may be used in various shapes and dimensions, depending upon the water or land from which the liquid hydrocarbon is to be removed. These structures include but are not limited to a boom 900 (FIGS. 9A and 9B), mop 1000 (FIG. 10A), coastal mop 1001 (FIG. 10B), snare boom, sock, sheet, mat, sweep, block 600 (FIG. 6A), pad 601 (FIG. 6B), wipe, strips 701, mitt 1302 (FIG. 13B), pom-pom 800 and 803 (FIGS. 8A and 8B), or pillows. The pads were retrieved after several hours and the liquid hydrocarbon was removed by squeezing it from the open-cell foam. The hydrocarbons can be removed from the foam by gloved hands, a wringer, a press, a centrifuge or any other method known in the art for removing liquid. The open-celled foam is reusable up to 100 times. The open-celled foam was then placed back on the surface of the water in need of liquid hydrocarbon removal.

Example 9

Removal of liquid hydrocarbons from below the surface of water: A netpack containing strips of the open-celled foam was placed below the surface of the water in need of liquid hydrocarbon removal. The open-celled foam may be used in various shapes and dimensions, depending upon the water or land from which the liquid hydrocarbon is to be removed. These structures include but are not limited to a boom 900 (FIGS. 9A and 9B), mop 1000 (FIG. 10A), coastal mop 1001 (FIG. 10B), snare boom, sock, sheet, mat, sweep, block 600 (FIG. 6A), pad 601 (FIG. 6B), wipe, strips 701, mitt 1302 (FIG. 13B), pom-pom 800 and 803 (FIGS. 8A and 8B), or pillows. Weights were attached to the D rings 703 of the netpacks 700 to maintain the netpack 700 at a satisfactory depth. The netpacks 700 were retrieved after several hours and the liquid hydrocarbon was removed by squeezing it from the open-cell foam. The hydrocarbons can be removed from the foam by gloved hands, wringer rollers 1102, a press, a centrifuge 1200, or any other method known in the art for removing liquid. The open-celled foam is reusable up to 100 times. The weighted netpack 700 of the open-celled foam was then placed back in the water in need of liquid hydrocarbon removal.

Example 10

Removal of liquid hydrocarbons from land: A pad 601 of the open-celled foam will be used by a human or in conjunction with a device to remove liquid hydrocarbon on the surface land or rocks in need of liquid hydrocarbon removal. In an embodiment, the land is a beach or coastline. The device may consist of a roller covered by the open-celled foam that may be pushed or pulled by hand or machine. The pads 601 may also be used to directly wipe off the liquid hydrocarbon from the beach by hand. Sheets of the open-celled foam may be spread over beaches to absorb oil that is coming ashore. The open-celled foam may be used in various shapes and dimensions, depending upon the water or land from which the liquid hydrocarbon is to be removed. These structures include but are not limited to a boom 900 (FIGS. 9A and 9B), mop 1000 (FIG. 10A), coastal mop 1001 (FIG. 10B), snare boom, sock, sheet, mat, sweep, block 600 (FIG. 6A), pad 601 (FIG. 6B), wipe, strips 701, mitt 1302 (FIG. 13B), pom-pom 800 and 803 (FIGS. 8A and 8B), or pillows. Mops 1000 attached to poles may also be used to clean the beach. The open-celled foam will be used until it does not substantially absorb additional liquid hydrocarbon. The liquid hydrocarbon will be removed from the foam by squeezing it from the open-cell foam. The squeezing may occur using gloved hands, wringer rollers 1102, a press, a centrifuge 1200, or any other method known in the art for removing liquid. The open-celled foam is reusable up to 100 times. The open-celled foam will be immediately reused to remove the liquid hydrocarbon from land in need of liquid hydrocarbon removal. These methods may be used in conjunction with sifting the sand on the beaches to remove oiled sand.

Example 11

Removal of liquid hydrocarbon from animals: The open-cell foam will be used to clean liquid hydrocarbon from the skin, feathers, or fur of animals. The open-celled foam may be used in various shapes and dimensions. These structures include but are not limited to a boom 900 (FIGS. 9A and 9B), mop 1000 (FIG. 10A), coastal mop 1001 (FIG. 10B), snare boom, sock, sheet, mat, sweep, block 600 (FIG. 6A), pad 601 (FIG. 6B), wipe, strips 701, mitt 1302 (FIG. 13B), pom-pom 800 and 803 (FIGS. 8A and 8B), or pillows. In an embodiment, sheets or mitt 1302 of the foam will be used to wipe off the surface of the animal. The oil will be removed from the sheet or mitt 1302 and the sheet or mitt 1302 reused. In an embodiment, the open-cell foam mitt 1302 will be used to remove oil from the feathers of birds. In one embodiment, the oil is due to oil sheen present on the water. Birds may die of hypothermia after exposure to oil as the oil present on their feathers may cause the bird's body temperature to decrease from about 107° F. to about 100° F.

Example 12

Submergible underwater oil detection and removal: Open-cell foam pom-poms 800 and 803 and a weight were attached to a rope 802 and placed approximately 40 feet below the surface of the water for approximately 24 hours in waters suspected of having oil present. The pom poms 800 and 803 attached to the rope 802 were connected in 10 to 20 feet lengths of rope 802 and can connected to provide the desired length. Bouys were attached to the pom poms 800 and 803 to mark the location of the pom poms. The pom-poms 800 and 803 were removed from the water. The open-cell foam did not break apart in rough currents or promote microbial growth. The pom poms 800 and 803 were provided to GeoLabs, Inc. of Braintree, Mass. with chain of custody documentation. Extractable samples were extracted and volatile samples were analysed with method specified holding times. GeoLabs, Inc. tested the samples for the presence of total petroleum hydrocarbons and polycylic aromatic hydrocarbons. The samples were presented to Geolabs, Inc. and were tested using a Soxlet method EPA 3540 for extraction, Modified EPA Method 8100 for detection of total petroleum hydrocarbons, and EPA Method 8270 for detection of polycyclic aromatic hydrocarbons. The results are found in Table 12 and Table 13. A level of 1310 mg/Kg-dry total petroleum hydrocarbons was detected in comparison to a level of 668 mg/Kg-dry total petroleum hydrocarbon for the control. These results indicated that the pom poms had absorbed oil from the water. A wide range of carbon chains from approximately 6 carbons to approximately 40 carbons were detected. The open-cell foam acts as detection and removal devices for hydrocarbons and hydrocarbon plumes.

TABLE 12

| Total Petroleum Hydrocarbons | Sample (mg/Kg-dry) | Control (mg/Kg-dry) |
| --- | --- | --- |
| Total Petroleum Hydrocarbons | 1310 | 668 |

TABLE 13

| Polycyclic Aromatic Hydrocarbons | Sample (% REC) | Control (% REC) |
| --- | --- | --- |
| Pyrene surr: 2-fluorobiphenyl | 87.6 | 91.4 |
| Pyrene surr: nitrobenzene-d5 | 93.2 | 90.6 |
| Pyrene surr: terphenyl-d14 | 55.8 | 77.4 |

Example 13

An example of the final composition of a formulation including a metallocene polymer is found in Table 14.

TABLE 14

| Component | phr (parts per hundred rubber) in final product |
| --- | --- |
| Polyethylene | 40 |
| Ethylene Methyl Acrylate copolymer (20% acrylate) | 40 |
| Ethylene Octene Metallocene Polymer (such as Engage 8452) | 20 |
| Calcium Carbonate | 20 |
| Silicone Oil | 0.9 |
| Zinc Stearate | 0.3 |
| Zinc Oxide | 0.1 |
| Green Color Concentrate (use one of green, white, or blue color concentrate depending upon color required) | 3 |
| White Color Concentrate (70% $TiO_2$) (use one of green, white, or blue color concentrate depending upon color required) | 2.4 |
| Blue Color Concentrate (use one of green, white, or blue color concentrate depending upon color required) | 1 |
| Biodegradation additive - Sierra SR2001 | 1 |
| Foaming agent residuals including urea, biurea, cyanuric acid, and urazole | <1 |
| Peroxide crosslinking agent residuals including mainly acetophenone with smaller amounts of dimethyl benzyl alcohol and alphamethyl-styrene | <0.7 |

All of the compositions and methods disclosed and claimed herein can be made and executed without undue experimentation in light of the present disclosure. While the compositions and methods have been described in terms of preferred embodiments, it will be apparent to those of skill in the art that variations may be applied to the compositions and methods and in the steps or in the sequence of steps of the methods described herein without departing from the concept, spirit and scope of this disclosure. More specifically, it will be apparent that certain agents which are both chemically and physiologically related may be substituted for the agents described herein while the same or similar results would be achieved. All such similar substitutes and modifications apparent to those skilled in the art are deemed to be within the spirit, scope and concept of the disclosure as defined by the appended claims.

We claim:

1. An open-cell cross-linked foam composition comprising:
  a) a blend of ingredients comprising:
    i) from about 20 to about 50 weight percent of polyethylene having a density between about 0.91 and about 0.95 g/cc and a melt index between about 1 and about 4 g/10 minutes;
    ii) from about 50 to about 80 weight percent of ethylene-alkyl acrylate copolymer having a melt index between about 0.5 and about 4 g/10 minutes;
    iii) a chemical foaming agent that decomposes to form a gas when the blend is heated during processing into the foam composition;
    iv) silicone oil;
    v) an organic peroxide cross-linker; and
    vi) an elastomer;

b) wherein the blend is processed to create a foam that has the following properties:
   i) open-cells created by crushing the foamed blend, wherein the average cell size is between 0.65 and 1.4 mm by ocular;
   ii) a density of from 1.5 to 2.0 pounds per cubic foot; and
   iii) an absorption weight capacity of SAE 30 oil of at least about 30 times the weight of the open-cell foam composition.

2. The composition of claim 1 wherein the blend further comprises a biodegradation initiator.

3. The composition of claim 1 wherein the open-cell foam composition is used to selectively absorb liquid hydrocarbons from a mixture of liquid hydrocarbons and water.

4. The composition of claim 3 wherein the open-cell foam composition has an absorption weight capacity of SAE 90 oil of at least about 27 times the weight of the open-cell foam composition.

5. The composition of claim 4 wherein the open-cell foam composition has an absorption weight capacity of SAE 10W-30 oil of at least about 25 times the weight of the open-cell foam composition.

6. The composition of claim 3 wherein the blend further comprises an inorganic filler.

7. The composition of claim 6 wherein the copolymer comprises from about 20% to about 25% acrylate.

8. A structure constructed and arranged to remove liquid hydrocarbons from a mixture of liquid hydrocarbons and water comprising the open-cell foam composition of claim 1.

9. The structure of claim 8 in the form of one or more separate pieces.

10. The structure of claim 9 in the form of a series of strips.

11. The structure of claim 10 wherein the strips are submerged using weights.

12. The structure of claim 9 wherein the separate pieces are held close together.

13. The structure of claim 12 wherein the separate pieces are held close together by netting.

14. An open-cell cross-linked foam composition comprising:
   a) a blend of ingredients comprising:
      i) about 44 weight percent of polyethylene having a density of about 0.91 g/cc and a melt index between about 2.2 and 2.3 g/10 minutes;
      ii) about 56 weight percent of ethylene-alkyl acrylate copolymer having a density of about 0.94 g/cc, a melt index between about 2.0 and 2.1 g/10 minutes and comprising from about 20% to about 24% acrylate;
      iii) a biodegradation initiator;
      iv) a cross-linking agent; and
      v) a chemical foaming agent;
   b) wherein the blend is processed to create a foam that has the following properties:
      i) open-cells created by crushing the foamed blend, wherein the average cell size is between 0.65 and 1.4 mm by ocular;
      ii) a density of from about 1.6 to about 2 pounds per cubic foot; and
      iii) an absorption weight capacity of SAE 30 oil of at least about 30 times the weight of the open-cell foam composition, an absorption weight capacity of SAE 90 oil of at least about 27 times the weight of the open-cell foam composition, and an absorption weight capacity of SAE 10W-30 oil of at least about 25 times the weight of the open-cell foam composition.

15. A structure constructed and arranged to remove liquid hydrocarbons from a mixture of liquid hydrocarbons and water comprising the open-cell foam composition of claim 14.

16. The structure of claim 15 in the form of a series of strips that are held close together.

17. The structure of claim 15 in the form of a number of separate pieces that are held close together with netting.

* * * * *